(12) United States Patent
Maxwell

(10) Patent No.: US 8,577,899 B2
(45) Date of Patent: Nov. 5, 2013

(54) DETECTING DUPLICATES IN A SHARED KNOWLEDGE BASE

(75) Inventor: John T. Maxwell, Santa Clara, CA (US)

(73) Assignee: Palo Alto Research Center Incorporation, Palo Alto, CA (US)

(*) Notice: Subject to any disclaimer, the term of this patent is extended or adjusted under 35 U.S.C. 154(b) by 600 days.

(21) Appl. No.: 12/718,610

(22) Filed: Mar. 5, 2010

(65) Prior Publication Data

US 2011/0219013 A1 Sep. 8, 2011

(51) Int. Cl.
- G06F 7/00 (2006.01)
- G06F 17/00 (2006.01)
- G06F 17/30 (2006.01)
- G06N 5/02 (2006.01)
- G06F 15/16 (2006.01)

(52) U.S. Cl.
USPC .............................. 707/750; 707/776; 706/50

(58) Field of Classification Search
USPC ..................................... 707/750, 776; 706/50
See application file for complete search history.

(56) References Cited

U.S. PATENT DOCUMENTS

| | | | |
|---|---|---|---|
| 6,269,364 B1 * | 7/2001 | Kennedy et al. .................. 707/5 |
| 6,424,358 B1 * | 7/2002 | DiDomizio et al. ........... 715/762 |
| 7,113,943 B2 * | 9/2006 | Bradford et al. .............. 707/750 |
| 7,251,648 B2 * | 7/2007 | Chaudhuri et al. ........... 707/750 |
| 2005/0198026 A1 * | 9/2005 | Dehlinger et al. ................. 707/5 |
| 2006/0041560 A1 * | 2/2006 | Forman et al. ................... 707/10 |
| 2008/0294621 A1 * | 11/2008 | Kanigsberg et al. .............. 707/5 |
| 2009/0248666 A1 * | 10/2009 | Ahluwalia ........................ 707/5 |

OTHER PUBLICATIONS

Nakov et al., "Using the Web as an Implicit Training Set: Application to Structural Ambiguity Resolution", EECS and SIMS, University of California at Berkeley, Berkeley, CA; in HLT/EMNLP'05, Vancouver, 2005.

* cited by examiner

Primary Examiner — Greta Robinson
Assistant Examiner — Brian E. Weinrich
(74) Attorney, Agent, or Firm — Fay Sharpe LLP

(57) ABSTRACT

Methods and systems supporting curation of items in a searchable knowledge base are provided. The methods and systems include mining one or more search queries of the searchable knowledge base, where each of the search queries includes a plurality of the items. The method further includes determining one or more pairs of items using a processor, where each of the pairs of items includes a correlation value exceeding a threshold. The correlation values for the pairs of items are based upon the frequency the items of the pairs of items co-occur within the search queries. The method further includes providing the pairs of items to a curator, where the curator reviews the pairs of items.

28 Claims, 6 Drawing Sheets

DETECTING DUPLICATES IN A SHARED KNOWLEDGE BASE

BACKGROUND

The present exemplary embodiments relate generally to the management of knowledge bases. They find particular application in conjunction with the removal of expired and/or duplicate items within knowledge bases, and will be described with particular reference thereto. However, it is to be appreciated that the present exemplary embodiments are also amenable to other like applications.

Communities often construct shared knowledge bases pertaining to one or more broad topics, where members of the communities contribute items to the knowledge bases. An item corresponds to knowledge on a specific issue and/or topic relevant to any one of one or more broad topics covered by a knowledge base. By contributing items to a knowledge base, other members of the corresponding community are able to search out and utilize the collective knowledge of the community. One example of a knowledge base is the EUREKA system from XEROX, which contains a searchable database of repair tips pertaining to copiers.

Shared knowledge bases, such as the EUREKA system, improve efficiency of associated communities by saving members' time and resources when diagnosing and/or solving problems. However, knowledge bases require the constant oversight of curators, which review items within a knowledge base to validate, edit, and combine similar items. Without oversight from curators, the usefulness of knowledge bases suffer over time as the knowledge bases become cluttered with duplicate and/or expired items; members must sift through many items to find the most relevant and useful items.

While curators try to find and remove duplicate and/or expired items, many still remain. It may be that a community lacks sufficient resources (e.g., curators) to properly monitor the items within its knowledge base or that the curators simply missed the duplicate and/or expired items. Naturally, curators whether human or machine are prone to make mistakes.

To address these problems, systems have been developed to help curators seek out and remove duplicate and/or expired items. Such systems generally work by modeling the search algorithm employed by a knowledge base by reviewing items within a knowledge base to determine those items having similar terms as other items within the knowledge base; for example, using term frequency with an inverse document frequency factor.

A problem with these systems, however, is that they fail to account for the particular search algorithm used by a knowledge base. Put another way, they fail to consider how members of a community interact with the knowledge base. Thus, as the search algorithm employed by a knowledge base changes, the set of duplicate and/or expired items encountered by community members may change, but known systems continue detecting duplicates in the same manner.

To illustrate, it may be that two items within a knowledge base are duplicates of one another, but use different vocabularies. Under the systems noted above, the two items would not be considered duplicates since they share few terms in common. However, the search algorithm employed by the knowledge base might include a synonym database equating the different vocabularies of the two items, whereby said items would generally co-occur in search results.

In view of the deficiencies noted above, there exists a need for an improved system of detecting expired and/or duplicate items within a knowledge base. The present application contemplates new and improved systems and/or methods which may be employed to mitigate the above-referenced problems and others.

BRIEF DESCRIPTION

According to one aspect of the present application, a system and method is provided for supporting curation of items in a searchable knowledge base. One or more search queries of the searchable knowledge base are mined, where each of the search queries include a plurality of the items. One or more pairs of items are determined using a processor, where each of the pairs of items includes a correlation value exceeding a threshold. The correlation values for the pairs of items are based upon the frequency the items of the pairs of items co-occur within the search queries. At least one of the pairs of items are provided to a curator, where the curator reviews the pairs of items.

According to another aspect of the present application, a system and method is provided for supporting curation of a new item in a searchable knowledge base. The searchable knowledge base includes a plurality of items. One or more search queries of the searchable knowledge base are mined, where each of the search queries includes a plurality of the items. At least one of the search queries is run against the searchable knowledge base and one or more items are determined using a processor, where each of the items includes a correlation value exceeding a threshold. The correlation values for the items are based upon the frequency the items co-occur with the new item in at least one of the run search queries. Then at least one of the determined items is provided to a curator, where the curator reviews the provided items.

DETAILED DESCRIPTION

The present systems and methods disclosed herein pertain to the removal of expired and/or duplicate items within knowledge bases. The systems and methods seek to help curators of a knowledge base find expired and/or duplicate items within the knowledge base which are most likely to be encountered by users of the knowledge base. As will be seen, the systems and methods accomplish this through the use of the search algorithm employed by a particular knowledge base, which advantageously accommodates changes in search technology and accounts for how users interact with a knowledge base.

Figure 1:
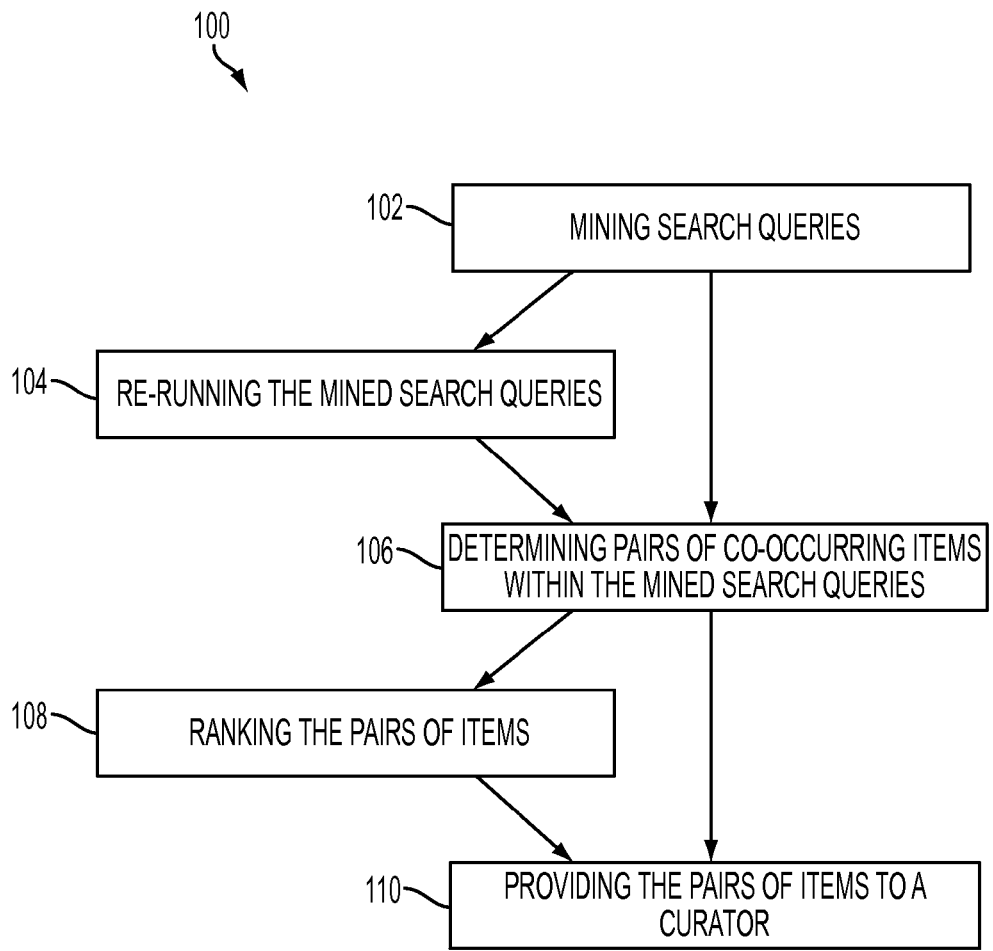
FIG. 1 is flow chart of a method for supporting curation of items in a searchable knowledge base.

With reference to FIG. 1, a flow chart of a method 100 for supporting curation of items in a searchable knowledge base is illustrated. In certain embodiments, the knowledge base is an Internet forum and/or the items of the knowledge base are repair tips pertaining copiers, as in the case of the EUREKA system from XEROX. The method 100 includes mining search queries (Action 102), determining pairs of co-occurring items within the mined search queries (Action 106) and providing the pairs of items to a curator (Action 110). In certain embodiments, the method 100 may further include re-running the mined search queries (Action 104) and/or ranking the determined pairs of co-occurring items (Action 108).

Beginning with Action 102, search queries performed on the knowledge base are mined for later use. That is to say, search terms and/or search results of a search query are saved for future use. Search terms refer to the words and/or phrases passed to a search algorithm associated with the knowledge base, and search results refer to one or more items of the knowledge base returned by the search algorithm in response to the search terms. Search queries are performed by users associated with the knowledge base, wherein users generally provide search terms in exchange for search results.

The decision as to whether to save the search terms, the search results, or both the search terms and search results depends upon the operator of the knowledge base. The operator is the party that operates the computer hardware necessary to maintain the knowledge base. Thus, it should be appreciated that the knowledge base is configured to operate within one or more processors, which may be distributed across one or more processing devices, such as servers, interconnected via one or more communications networks, such as the Internet. In certain embodiments, the operator is the curator.

Saving only the search terms saves space at the cost of increased processing time in the future, since a future search will need to be conducted. In addition to saving space, saving only the search terms ensures that search results are up to date, since a future search will need to be conducted. On the other hand, saving only the search results requires more space, but requires less processing time in the future, since no future search is needed. However, saving only the search results may lead to stale search results, since no future search is performed. Stale search results may reduce the effectiveness of the method 100 since they may fail to account for updates in the search algorithm employed by the knowledge base. Saving both the search terms and the search results requires the most space, but provides the most flexibility in that one can switch between one of the two operating regimes noted above (i.e., search terms only or search results only).

In certain embodiments, after the search queries are mined (Action 102), the mined search queries are re-run to collect current search results (Action 104). Naturally, the ability to re-run the mined search queries depends upon whether the search terms were saved when mining the search queries. Further, as will be seen, Action 104 is necessary if only the search terms were saved while mining the search queries; Actions to be described hereafter require search results. In certain embodiments, the search queries are re-run periodically, such as every week, or re-run when the Actions hereafter described are performed. By re-running the search queries, the likelihood of stale search results is mitigated, if not eliminated, whereby the detection of duplicate and/or expired items is improved.

Regardless of whether the mined search queries need to be re-run (Action 104), pairs of co-occurring items within the mined search queries are determined next (Action 106). This involves determining a correlation value for each pair of items within the mined search queries and determining those pairs having correlation values exceeding a threshold specified by the operator and/or curator of the knowledge base. The pairs of items within the mined search queries are the unique pairs of items within the search results of the mined search queries. The correlation value for a pair of items roughly approximates the likelihood the items of the pair are duplicates of each other and/or one of the items of the pair is an expired variant of the other.

With respect to determining the correlation value for a pair of items, in one embodiment the correlation value is based upon the frequency the items of the pair co-occur within the search results of the mined search queries. Therefore, the more the items of a pair co-occur within search results, the higher the correlation value. For example, a pair of items co-occurring in the search results of five search queries will have a higher correlation value than a pair of items co-occurring in only two search queries. In certain embodiments, the correlation value for a pair of items may further account for terms the items of the pair share using term frequency and, optionally, an inverse document frequency factor. In certain other embodiments, the correlation value for a pair of items may further account for the frequency with which the search queries of the pair of items occur. That is to say, a pair of items having items which co-occur in search queries which frequently occur is given a higher correlation value than a pair of items having items which co-occur in search queries which less frequently occur. It is to be understood the above were simply examples of categories that may be used in determining a correlation value and a system may be constructed to use other categories in making such a determination.

After, or contemporaneous, with the determination of correlation values, the correlations values are compared with a threshold set by the operator and/or curator of the knowledge base. Pairs of items having a correlation value exceeding the threshold are selected and pairs of items having a correlation value below the threshold are discarded. The threshold is set at a level where the operator and/or curator deem pairs of items as deserving further attention. In other words, since the correlation value roughly approximates the likelihood of the items of a pair being duplicates of each another and/or one of the items of the pair being an expired variant of the other, the threshold is set at a level where the operator and/or curator deem the likelihood of such an occurrence as sufficiently high to warrant further analysis.

In certain embodiments, after the pairs of co-occurring items are determined (Action 106), the pairs of co-occurring items are ranked according to their correlation values (Action 108). This may entail ranking the pairs of items such that those most likely to include duplicates and/or include expired variants are ranked first.

Whether ranked (Action 106) or not, the pairs of co-occurring items are provided to the curator for review next (Action 110). In certain embodiments where the pairs of items have been ranked, only those pairs of items ranked above a threshold may be provided to the curator. In certain other embodiments where the pairs of items have been ranked, the pairs of items are provided to the curator, from highest ranked to lowest ranked, until the curator says otherwise or all the pairs of items have been provided to the curator. The curator reviews each pair of items to determine those pairs of items comprising duplicate and/or expired items. If the curator finds a pair of items having duplicate items, the curator merges the items. If the curator finds a pair of items having an item which is an expired variant of the other item of the pair, the curator deletes the expired item of the pair.

Figure 2:
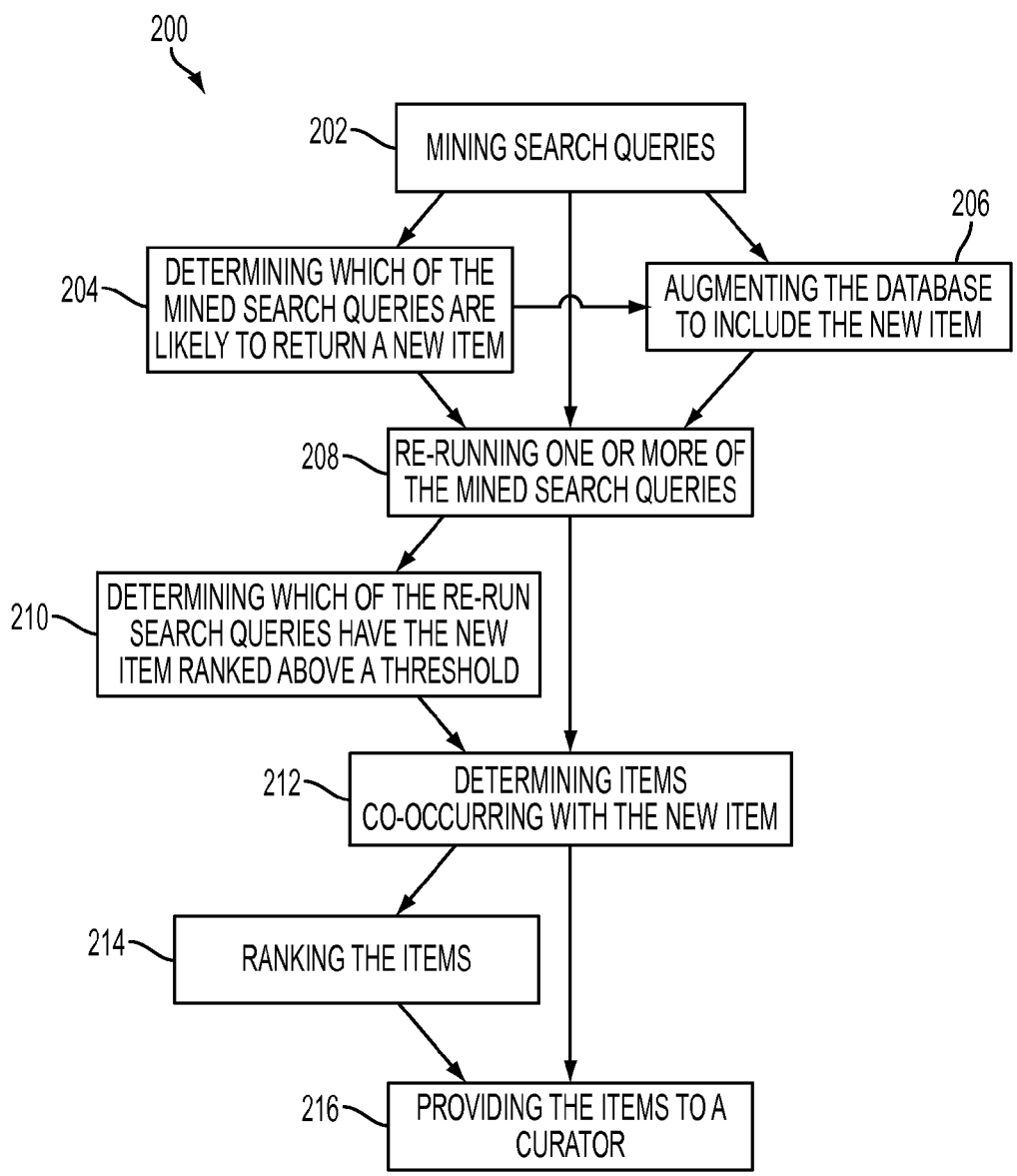
FIG. 2 is a flow chart of a method for supporting curation of a new item in a searchable knowledge base.

With reference to FIG. 2, a flow chart of a method 200 for supporting curation of a new item in a searchable knowledge base is illustrated. The method 200 will generally be used when a curator wants to determine whether a knowledge base includes any duplicate and/or expired variants of the new item. As with the method 100 of FIG. 1, in certain embodiments, the knowledge base is an Internet forum and/or the items of the knowledge base are repair tips pertaining copiers, as in the case of the EUREKA system from XEROX.

In certain embodiments, a new item is an item that has recently been added to a knowledge base, whereby it has only been a part of a few search queries conducted on the knowledge base, if any. Under these embodiments, a new item will generally be added by a user of the knowledge base. In other embodiments, a new item is an item that has recently been submitted for addition to a knowledge base, whereby it has never been a part of any search queries conducted on the knowledge base. Under these embodiments, a curator must approve the addition of new items into the knowledge base. Accordingly, a new item will generally be submitted by a user of the knowledge base and added by the curator of the knowledge base.

The method 200 includes mining search queries (Action 202), running at least one of the mined search queries (Action 208), determining items co-occurring with the new item within at least one of the run search queries (Action 212), and providing the determined items to a curator (Action 216). In certain embodiments, the method 200 may further include one or more of determining which of the mined search queries are likely to return the new item (Action 204), augmenting the knowledge base to include the new item (Action 206), determining which of the run search queries have the new item ranked above a threshold (Action 210), and ranking the determined items according to the frequency with which they co-occur with the new item (Action 214).

As will become apparent, the method 200 is similar to the method 100 of FIG. 1. However, in contrast with the method 100 in which the items of interest are present within the mined search queries, the item of interest—the new item—is only present in a few, if any, of the mined search queries.

Beginning with Action 202, search queries performed on the knowledge base are mined for later use, substantially as described in connection with the method 100 of FIG. 1. In fact, it is contemplated that the data mined herein may be used with the method 100 of FIG. 1, and vice versa. As with the method 100 of FIG. 1, search queries are performed by users associated with the knowledge base, wherein users generally provide search terms in exchange for search results. There is, however, one caveat; the search terms should be saved for future use. As will be seen, the search terms are generally needed to carry out the method 200. Thus, the operator of the knowledge base may choose between saving the search terms or saving both the search terms and the search results.

In certain embodiments, after the search queries are mined, the number of search queries to be processed in subsequent Actions is narrowed by determining which of the mined search queries are likely to return the new item (Action 204). As should be appreciated, this is not a required Action, but simply serves to reduce processing time hereafter. The exact details of this Action depend on the search algorithm employed by the knowledge base. However, in the context of a keyword based search algorithm, a general approach is to determine correlation values between the search terms of the search queries and the new item, where search queries having a correlation value below a threshold are discarded for the remainder of the method 200. The correlation values may, for example, be determined using term frequency with an optional document inverse frequency factor. Regardless of how this determination is made, the operator should set the threshold for discarding search queries at the level they deem search queries to be irrelevant. As a general matter, this should be high so that only the obviously irrelevant search queries are discarded.

In certain embodiments, the knowledge base is temporarily augmented to include the new item next (Action 206). As will be seen, this is necessary under certain embodiments, because, as noted above, a curator may be running the method 200 to determine whether to allow the addition of the new item into the knowledge base.

Regardless of whether it was necessary to augment the knowledge base, either all the mined search queries or the search queries which were determined as being likely to return the new item are run (Action 208); the latter referring to those search queries determined in Action 204, discussed above. Running the search queries simply entails passing the search terms of the search queries to the search algorithm employed by the knowledge base. As should be appreciated, when the search queries were originally run, the new item was probably not in existence. Hence, the search queries are re-run to determine whether or not the search algorithm employed by the knowledge base would have returned the new item had it been in existence when they were originally run.

In certain embodiments, once the search queries have been run, a determination is made as to which of the existing search queries rank the new item above a threshold set by the operator and/or curator (Action 210). Those search queries ranking the new item below the threshold are discarded for the remainder of the method 200. The operator and/or curator set the threshold to remove search queries which only loosely consider the new item relevant, as evidenced by rank within search results. The rationale being that search queries which poorly rank the new item are unlikely to be directed towards the new item, whereby duplicate items and/or expired items associated with the new item are unlikely to hinder user efficiency when searching in the context of these search queries. As should be appreciated, this Action serves to narrow the search queries that need to be considered in subsequent steps, thereby reducing processing.

Regardless of whether the search queries are limited as described in Action 210, items co-occurring with the new item within the remaining re-run search queries are determined next (Action 212). This involves determining a correlation value for each item within the results of the remaining re-run search queries and determining those items having correlation values exceeding a threshold specified by the operator and/or curator of the knowledge base. The correlation value for an item roughly approximates the likelihood the item is a duplicate and/or expired variant of the new item.

With respect to determining the correlation for an item, in certain embodiments the correlation value is based upon the frequency the item co-occurs with the new item in the remaining re-run search queries. Therefore, the more an item co-occurs with the new item within the remaining re-run search queries, the higher the correlation value. For example, an item co-occurring with the new item in the search results of five search queries will have a higher correlation value than an item co-occurring with the new item in only two search queries. In certain embodiments, the correlation value for an item may further account for terms the item shares with the new item using term frequency and, optionally, an inverse document frequency factor. In certain other embodiments, the correlation value for an item may further account for the frequency with which the search queries of the item occur. That is to say, an item which co-occurs with the new item in search queries which frequently occur is given a higher correlation value than an item which co-occurs with the new item in search queries which less frequently occur. It's to be understood the above were simply examples of categories that may be used in determining a correlation value and a system may be constructed to use other categories in making such a determination.

After, or contemporaneous, with the determination of correlation values, the correlations values are compared with a threshold set by the operator and/or curator of the knowledge base. Items having a correlation value exceeding the threshold are selected and items having a correlation value below the threshold are discarded. The threshold is set at a level where the operator and/or curator deem an item as deserving of further attention. In other words, since the correlation value roughly approximates the likelihood of an item being a duplicate and/or expired variant of the new item, the threshold is set at a level where the operator and/or curator deem the likelihood of such an occurrence as sufficiently high to warrant further analysis.

In certain embodiments, after the items are determined (Action 212), the pairs of items are ranked according to their correlation values (Action 214). This may entail ranking the items such that those most likely to be a duplicate and/or expired variant of the new item are ranked first.

Whether ranked (Action 214) or not, the items are provided to the curator for review next (Action 216). In certain embodiments where the items have been ranked, only those items ranked above a threshold may be provided to the curator. In certain other embodiments where the items have been ranked, the items are provided to the curator, from highest ranked to lowest ranked, until the curator says otherwise or all the items have been provided to the curator. The curator reviews the items to determine whether any of the items are duplicate and/or expired variants of the new item. If an item is a duplicate of the new item, the curator merges the new item with the duplicate item. Alternative, in embodiments where the new item has not been added to the knowledge base yet, the curator may reject the addition of the new item. If an item is an expired variant of the new item, the curator deletes the expired variant of the new item. In embodiments where the new item has not been added to the knowledge base yet, the curator further adds the new item to the knowledge base.

As should be appreciated in view of the discussion heretofore, an advantage of the methods described in FIGS. 1 and 2 is that they directly minimize the number of duplicate results that the average search query produces. Another advantage is that they automatically adjust to changes in how the search query system of a knowledge base system works, since they use the query system directly rather than trying to model its effects in some way. Hence, as the search algorithm employed by a knowledge base improves, so will the accuracy of the methods in detecting duplicate and/or expired items.

Figure 3:
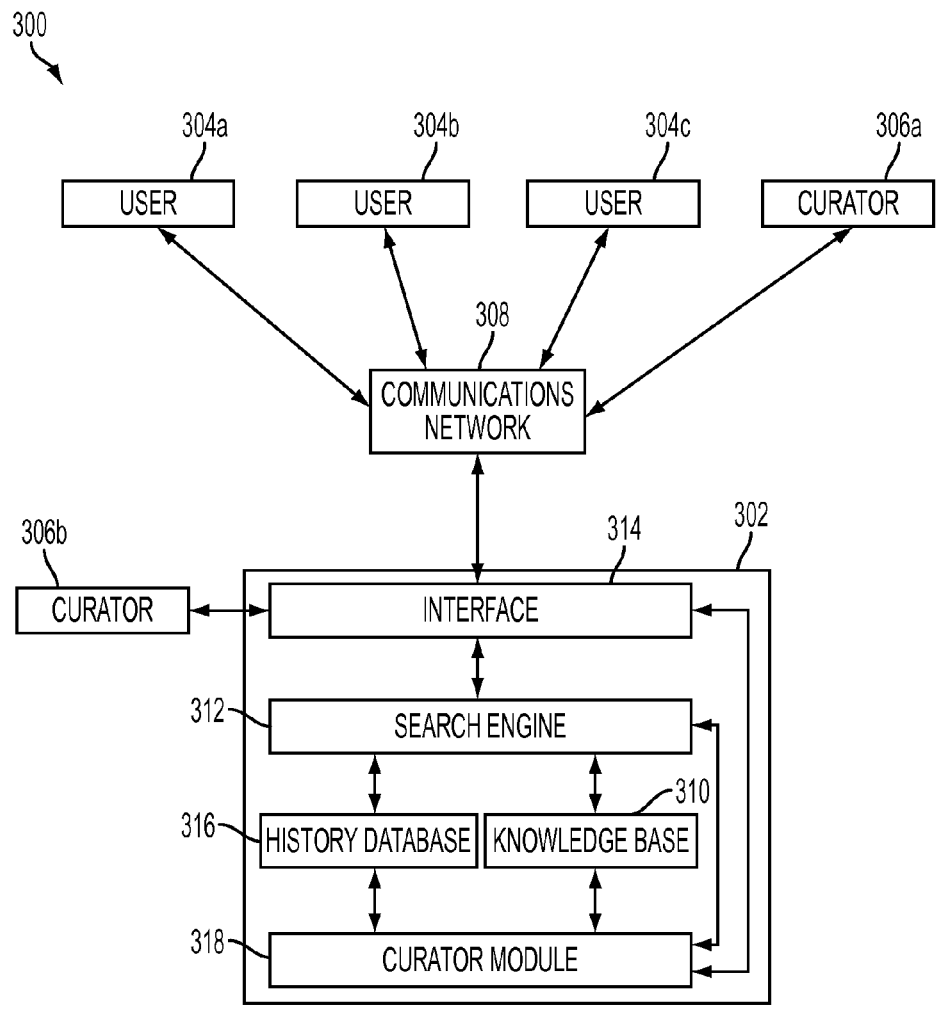
FIG. 3 is a block diagram of a system employing a knowledge base system.

With reference to FIG. 3, a system 300 employing a knowledge base system 302 according to aspects of the present application is illustrated. The system 300 includes the knowledge base system 302, a plurality of users 304a, 304b, 304c and a first curator 306a interconnected with a communications network 308. The communications network 308 is, for example, the Internet, a local area network (LAN), or any other type of communications network. The system 300 further includes a second curator 306b communicating directly with the knowledge base system 302.

The users 304a, 304b, 304c are members of the community associated with the knowledge base system 302, and, as a general proposition, the users 304a, 304b, 304c contribute knowledge to the community by way of adding items to the knowledge base system 302. Additionally, the users 304a, 304b, 304c search out and utilize the collective knowledge of the community to solve and/or diagnosis problems previously dealt with by other users.

The curators 306a, 306b are also members of the community associated with the knowledge base system 302 and are tasked with maintaining the quality and integrity of the content therein. In other words, the curators 306a, 306b are tasked with validating, editing, and combining similar items within the knowledge base system 302. In certain embodiments, the curators 306a, 306b are the operators of the knowledge base system 302.

The users 304a, 304b, 304c and/or the curators 306a, 306b suitably interact with the knowledge base system 302 using a computer or other digital processing device operatively connected with one or more user input devices, such as a keyboard for receiving user input, and one or more display devices, such as a display for displaying data received from the knowledge base system 302. Other digital processing devices include a smart phone, a tablet PC, a netbook, an IPAD, an IPOD, a personal data assistant (PDA) and/or any other like processing device. In certain embodiments, the users 304a, 304b, 304c and/or the curators 306a, 306b interact with the knowledge base system 302 over a communications network, as shown in FIG. 3.

The knowledge base system 302 includes a knowledge base 310, a search engine 312, an interface 314, a history database 316, and a curator module 318. Although the constituent components will be described in more detail below, briefly, the knowledge base system 302 provides the users 304a, 304b, 304c with the tools to pool and utilize the collective knowledge of the community associated with the knowledge base system 302. Similarly, the knowledge base system 302 provides the curators 306a, 306b with the tools to manage the collective knowledge of the community, so as to ensure the quality of the knowledge disposed within the knowledge base system 302. It should also be appreciated that even though the constituent components are grouped together in FIG. 3, said components may be distributed across one or more processing devices interconnected by a communications network.

One or more computers, or other digital processing devices, and storage suitably embody the knowledge base system 302. Digital processing devices include digital processors, such as microprocessors, microcontrollers, graphic processing units (GPU), etc. In other embodiments, one or more servers having one or more digital processors and including, or having access to, digital data storage may embody the knowledge base system 302. The one or more servers may suitably be accessed via the Internet or a local area network, or by a personal data assistant (PDA) including a digital processor and digital data storage, or so forth.

The knowledge base 310 includes a plurality of items, where items correspond to knowledge on a specific issue and/or topic relevant to any one of one or more broad topics covered by the knowledge base system 302. In certain embodiments, the knowledge base 310 is employed within a database, such as a relational database and/or a SQL database. Additionally, the knowledge base 310 may be distributed across one or more databases interconnected by one or more communications networks.

Figure 4:
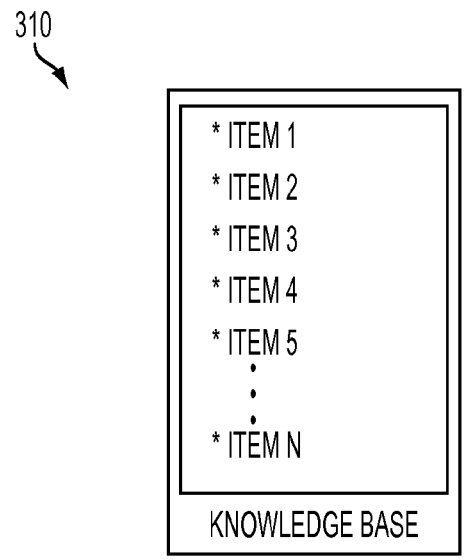
FIG. 4 is an illustration of a knowledge base.
Figure 5:
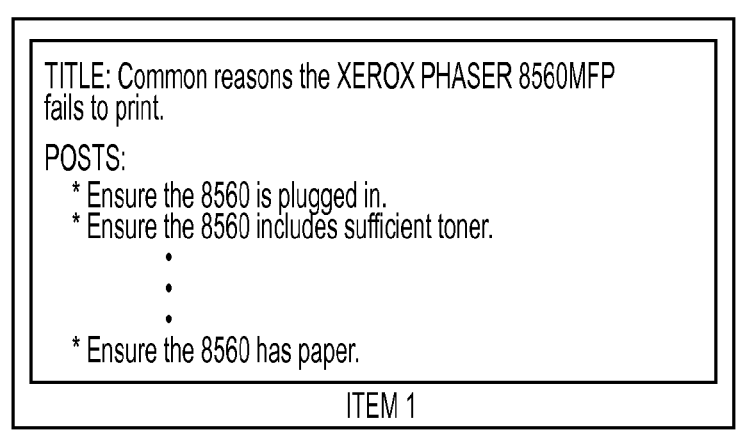
FIG. 5 is an illustration of an item within the knowledge base of FIG. 4.

With reference to FIG. 4, an example of the knowledge base 310 is illustrated. The knowledge base 310 includes a plurality of items (ITEM 1-ITEM N), each identified with "*". With reference to FIG. 5, item 1 of FIG. 4 is illustrated in detail. Therein, one will note the item includes a title identifying the issue and/or topic addressed by the item and a plurality of posts (each identified with "*") from the users 304a, 304b, 304c of the knowledge base system 302, where each post is relevant to the issue and/or topic of the item. Item 1 specifically concerns reasons why the XEROX PHASER 8560MFP fails to print, such as lack of power, insufficient toner, and lack of paper.

Referring back to FIG. 3, the search engine 312 employs a search algorithm to search the knowledge base 310 and returns search results in response to search terms. As should be appreciated, no particular search algorithm is required for operation of the present concepts. Nonetheless, in certain embodiments, the search algorithm is a simple keyword based algorithm, whereby search queries are comprised of one or more search terms. In embodiments employing a keyword based algorithm, one or more of a synonym database, term frequency and an inverse document frequency factor may be used. In certain other embodiments, the search algorithm is a PageRank algorithm, which uses information outside the items of the knowledge base to determine whether they are relevant to a query.

The interface 314 provides means for the users 304a, 304b, 304c and/or the curators 306a, 306b to search and/or manage the items within the knowledge base 310. In certain embodiments, the interface 314 is a web server providing web access to the knowledge base system 302 via a communications network, such as the Internet. Under such embodiments, the interface 314 may use one or more of AJAX, JavaScript, XML, HTML, DHTML, etc. to allow users and/or curators to interact with the knowledge base system 302 via a web browser, such as INTERNET EXPLORER, FIREFOX, etc. In other embodiments, the interface 314 acts as a server to provide console based access to the knowledge base system 302 over a communications network, whereby the users 304a, 304b, 304c and/or the curators 306a, 306b interact with the knowledge base system 302 via protocols such as telnet and SSH. In other embodiments, the interface 314 may provide a graphical user interface to a locally connected display device, such as a monitor, whereby the users 304a, 304b, 304c and/or the curators 306a, 306b may interact with the knowledge base system 302 directly. As shown, the interface 314 interacts with the communications network 308, whereby users 304a, 304b, 304c and/or curators 306a, 306b can interact with the knowledge base 310 remotely. Additionally, the interface 314 directly interacts with the second curator 306b.

The history database 316 stores search queries previously performed by the search engine 312. Search queries include search terms provided to the search engine 312 and/or corresponding search results returned by the search engine 312. As discussed in connection with the method 100 of FIG. 1 and the method 200 of FIG. 2, the operator has a choice as to what is stored in the history database. That is to say, the operator may choose between saving only the search terms, only the search results or both the search terms and the search results. As with the knowledge base 310, the history database 316, in certain embodiments, may be a relational database and/or a SQL database. Additionally, the history database 316 may be distributed across one or more databases interconnected by one or more communications networks.

Figure 6:
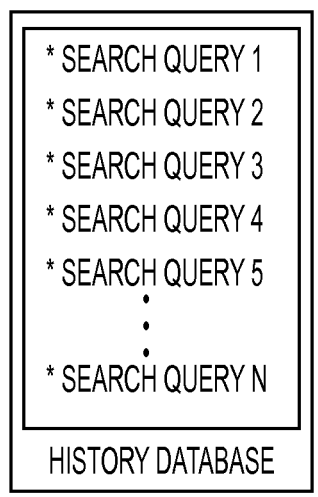
FIG. 6 is an illustration of a history database.
Figure 7:
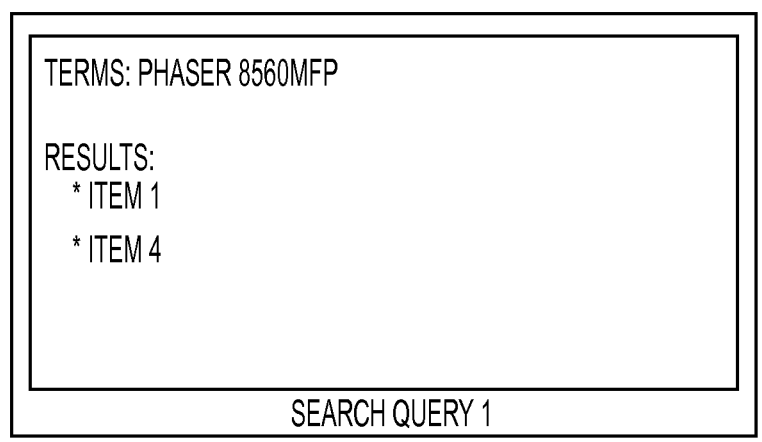
FIG. 7 is an illustration of a search query within the history database of FIG. 6; and, FIG. 8 is a block diagram of a curator module.

With reference to FIG. 6, an example of the history database 316 is illustrated. The history database 316 includes a plurality of search queries (SEARCH QUERY 1-SEARCH QUERY N), each identified with "*". With reference to FIG. 7, search query 1 of FIG. 6 is illustrated. Therein, one will note the search query includes terms previously passed to the search engine 312 and a plurality of results returned by the search engine 312 in response to the search terms (each identified with "*"). Specifically, the search terms of "PHASER 8560MFP" returned item 1 and item 4, where item 1 is illustrated in FIG. 5.

Figure 8:
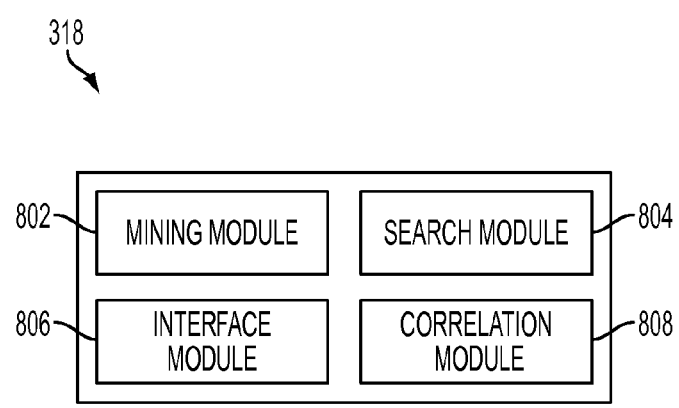

The curator module 318 corresponds to a discrete representation of components necessary to carry out the methods 100 and 200 of FIGS. 1 and 2. As shown in FIG. 8, the curator module 318 includes a mining module 802, a search module 804, an interface module 806, and a correlation module 808. Said modules, coordinate with each other to carry out the method 100 of FIG. 1 and/or the method 200 of FIG. 2. Additionally, it should further be appreciated that the curator module 318 is configured in a processor, where the processor is configured to operate software performing the various aspects of the method 100 of FIG. 1 and/or the method 200 of FIG. 2. The processor may be a general purpose processor, a microcontroller, an ASIC, an FPGA, or other like device, and, in certain embodiments, is machine specific to the operations of the present application.

Notwithstanding that the components of the curator module 318 are shown discretely, it should be appreciated that said components of the curator module 318 may be employed within other components of the knowledge base system 302, such as the search engine 312 and the interface 314. Additionally, the modules may further be combined and/or distributed across processing devices interconnected by one or more communications networks.

The mining module 802 performs Actions 102 and 202 of FIGS. 1 and 2, substantially as described above. It coordinates with the history database 316 and the search engine 312 to record search queries in the history database 316. In certain embodiments the mining module 802 receives search queries from the search engine 312 and records them in the history database 316. When recording the search queries in the history database 316, the mining module 802 may format and/or convert the search queries to meet the needs of the history database 316. In certain other embodiments, the mining module 802 is integrated with the search engine 312, whereby the search engine 312 records search queries directly with the history database 316.

The search module 804 coordinates with the search engine 312 to re-run search queries within the history database 316 depending upon the specific embodiment of the method 100 of FIG. 1 and/or the method 200 of FIG. 2. For example, in connection with the method 100 of FIG. 1, it was noted that search queries may be re-run periodically to mitigate the likelihood of stale search results. Under such an embodiment, the search module 804 would coordinate with the search engine 312 to perform this. In certain other embodiments, the search module 804 is integrated with the search engine 312, whereby the search engine 312 re-runs search queries as necessary.

The interface module 806 coordinates with the interface 314 to interact with the curators 306a, 306b. That is to say, the interface module 806 receives commands and/or provides responses to said commands from and/or to the curators 306a, 306b via the interface 314. Naturally, although not shown, in other embodiments, the interface module 806 is integrated with the interface 314.

The correlation module 808 determines the pairs of items having a sufficiently high correlation value as described in the method 100 of FIG. 1. Further, or in the alternative, the correlation module 808 determines the items having a sufficiently high correlation value as described in the method 200 of FIG. 1. Thus, the correlation module 808 carries out the majority of the method 100 of FIG. 1 and/or the method 200 of FIG. 2. In view of the role of the correlation module 808, it should be appreciated that it coordinates the efforts of the other modules of the curator module 318 and interacts with the history database 316 to read search queries recorded therein.

During use, the curator module 318 may receive a request from one of the curators 306a, 306b via the interface 314. Specifically, the interface module 806 of the curator module 318 receives the request. The interface module 806 then formats the request appropriately, if at all, and sends it to the correlation module 808. Depending upon how the curator module 318 is implemented, the request may be different depending upon whether operating under the method 100 of FIG. 1 or the method 200 of FIG. 2.

Upon receiving the request from the interface module 806, the correlation module 808 determines the type of request. If the request is for duplicate and/or expired items related to a new item, the correlation module 808 performs the method 200 of FIG. 2 and provides the items to the interface module 808. If the request is for pairs of duplicate and/or expired items, the correlation module 808 performs the method 100 of FIG. 1 and provides the pairs of items to the interface module 808. As noted above, while the correlation module is performing the method 100 of FIG. 1 or the method 200 of FIG. 2, it may call upon search module 804 to re-run search queries.

The interface module 806, upon receiving a response to its previously submitted request, returns the response to the interface 314, which, in turn, returns the results to the originally requesting curator. The curator can then review the items or the pairs of items, whichever was requested, and take appropriate action in subsequent requests to remove and/or merge duplicate and/or expired items.

Naturally, when receiving pairs of items, the curator simply reviews the two items of the pair to determine whether they are duplicates of each other and/or whether one of the items of the pair is an expired variant of the other item of the pair. Similarly, when reviewing items pertaining to a new item, the curator reviews the returned listing of items to determine whether the new item is a duplicate of any of the items in the returned list and/or whether any of the items in the returned list are expired variants of the new item.

It will be appreciated that various of the above-disclosed and other features and functions, or alternatives thereof, may be desirably combined into many other different systems or applications. For example, in some embodiments, the exemplary methods, discussed above, the systems employing the same, and so forth, of the present application are embodied by a storage medium storing instructions executable (for example, by a digital processor). The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Also, it will be appreciated that various presently unforeseen or unanticipated alternatives, modifications, variations or improvements therein may be subsequently made by those skilled in the art which are also intended to be encompassed by the following claims.

The invention claimed is:

1. A method for supporting curation of items in a searchable knowledge base, said method comprising:
    mining one or more search queries of the searchable knowledge base, wherein each of the one or more search queries includes a plurality of the items, each item including a title identifying an issue and/or topic addressed by the item and further including a plurality of posts from users of the knowledge base system, each post relevant to the issue and/or topic of the item;
    determining one or more pairs of items using a processor, wherein each of the one or more pairs of items include a correlation value exceeding a threshold, wherein the correlation value for the each of the one or more pairs of items is based upon a frequency the items of the each of the one or more pairs of items co-occur within the one or more search queries; and
    providing at least one of the one or more pairs of items to a curator, wherein the curator reviews the one or more pairs of items;
    wherein the one or more mined search queries are re-run before determining the one or more pairs or items, and wherein the one or more mined search queries are saved within a history database, each of the saved search queries corresponding to a previously performed search of the searchable knowledge base, identifying the search terms of the previously performed search, and identifying items of the searchable knowledge base returned in response to the previously performed search.

2. The method of claim 1, wherein the correlation value for the each of the one or more pairs of items is further based upon a frequency with which terms co-occur within the items of the each of the one or more pairs of items.

3. The method of claim 1, wherein the items of the searchable knowledge base are search tips.

4. The method of claim 1, wherein the curator removes duplicate items or expired items from the one or more pairs of items.

5. The method of claim 1, further comprising:
    ranking the each of the one or more pairs of items according the frequency the items of the each of the one or more pairs of items co-occur within the one or more search queries, wherein the each of the one or more pairs of items are ranked before the at least one of one or more pairs of items are provided to the curator.

6. The method of claim 5, where the at least one of the one or more pairs of items are provided to the curator until the curator says otherwise.

7. The method according to claim 1, wherein each of the one or more mined search queries includes search results including the plurality of the items.

8. The method according to claim 1, wherein the items in the knowledge base each correspond to a record of information on a specific issue or topic relevant to a topic covered by the knowledge base.

9. A method for supporting curation of a new item in a searchable knowledge base, wherein the searchable knowledge base includes a plurality of items, said method comprising:
    mining one or more search queries of the searchable knowledge base, wherein each of the one or more search queries includes search results including a plurality of the plurality of items of the knowledge base, each item including a title identifying an issue and/or topic addressed by the item and further including a plurality of posts from users of the knowledge base system, each post relevant to the issue and/or topic of the item;
    re-running at least one of the one or more mined search queries against the searchable knowledge base using a keyword based search algorithm;
    determining one or more items of the plurality of items of the knowledge base using a processor, wherein each of the one or more items include a correlation value exceeding a threshold, wherein the correlation value for the each of the one or more items is based upon a frequency the each of the one or more items co-occur with the new item in search results of at least one of the at least one of the one or more search queries; and providing at least one of the one or more items to a curator, wherein the curator reviews the at least one of the one or more items;

wherein the plurality of items of the knowledge base each correspond to a record of information on a specific issue or topic relevant to a topic covered by the knowledge base, and wherein the one or more mined search queries are saved within a history database, each of the saved search queries corresponding to a previously performed search of the searchable knowledge base, identifying the search terms of the previously performed search, and identifying items of the searchable knowledge base returned in response to the previously performed search.

10. The method of claim 9, further comprising:
determining which of the one or more search queries are likely to return the new item, wherein the at least one of the one or more search queries are the determined searched queries.

11. The method of claim 9, further comprising:
ranking the each of the one or more items according the frequency the each of the one or more items co-occur with the new item, wherein the each of the one or more items are ranked before the at least one of one or more items are provided to the curator.

12. The method of claim 11, where the at least one of the one or more items are provided to the curator until the curator says otherwise.

13. The method of claim 9, further comprising:
temporarily augmenting the knowledge base to include the new item before re-running the at least one of the one or more mined search queries.

14. The method of claim 9, further comprising:
determining which of the at least one of the one or more search queries include the new item ranked above a threshold, wherein the at least one of the at least one of the one or more search queries are the determined search queries.

15. The method of claim 9, wherein the mined one or more search queries exclude the new item.

16. The method of claim 9, wherein the correlation value for the each of the one or more items is further based upon a frequency with which terms of the each of the one or more items co-occur with terms of the new item.

17. The method of claim 16, wherein the frequency with which terms of the each of the one or more items co-occur with terms of the new item includes an inverse document frequency factor.

18. The method of claim 9, wherein the plurality of items of the searchable knowledge base are search tips.

19. The method of claim 9, wherein the curator removes duplicate items or expired items from the at least one of the one or more items.

20. A system for supporting curation of items in a searchable knowledge base, said system comprising:
at least one processor configured to:
mine one or more search queries of the searchable knowledge base, wherein each of the one or more search queries includes search results including a plurality of the items of the knowledge base, each item including a title identifying an issue and/or topic addressed by the item and further including a plurality of posts from users of the knowledge base system, each post relevant to the issue and/or topic of the item;
determine one or more pairs of items of the items of the knowledge base using a processor, wherein each of the one or more pairs of items include a correlation value exceeding a threshold, wherein the correlation value for the each of the one or more pairs of items is based upon a frequency the items of the each of the one or more pairs of items co-occur within search results of the one or more search queries; and
provide at least one of the one or more pairs of items to a curator, wherein the curator reviews the one or more pairs of items;
wherein the items of the knowledge base each correspond to a record of information on a specific issue or topic relevant to a topic covered by the knowledge base;
wherein the one or more mined search queries are re-run before determining the one or more pairs or items, and wherein the one or more mined search queries are saved within a history database, each of the saved search queries corresponding to a previously performed search of the searchable knowledge base, identifying the search terms of the previously performed search, and identifying items of the searchable knowledge base returned in response to the previously performed search.

21. The system of claim 20, wherein the correlation value for the each of the one or more pairs of items is further based upon a frequency with which terms co-occur within the items of the each of the one or more pairs of items.

22. The system of claim 20, wherein the items of the searchable knowledge base are search tips.

23. The system of claim 20, wherein the curator removes duplicate items or expired items from the one or more pairs of items.

24. A system for supporting curation of a new item in a searchable knowledge base, wherein the searchable knowledge base includes a plurality of items, said system comprising:
at least one processor configured to:
mine one or more search queries of the searchable knowledge base, wherein each of the one or more search queries includes search results including a plurality of the plurality of items of the knowledge base, each item including a title identifying an issue and/or topic addressed by the item and further including a plurality of posts from users of the knowledge base system, each post relevant to the issue and/or topic of the item;
re-run at least one of the one or more mined search queries against the searchable knowledge base using a PageRank algorithm, the PageRank algorithm using information external to the searchable knowledge base;
determine one or more items of the plurality of items of the knowledge base using a processor, wherein each of the one or more items include a correlation value exceeding a threshold, wherein the correlation value for the each of the one or more items is based upon a frequency the each of the one or more items co-occur with the new item in search results of at least one of the at least one of the one or more search queries; and
provide at least one of the one or more items to a curator, wherein the curator reviews the at least one of the one or more items;
wherein the plurality of items of the knowledge base each correspond to a record of information on a specific issue or topic relevant to a topic covered by the knowledge base, and wherein the one or more mined search queries are saved within a history database, each of the saved search queries corresponding to a previously performed search of the searchable knowledge base, identifying the search terms of the previously performed search, and identifying items of the searchable knowledge base returned in response to the previously performed search.

25. The system of claim 24, wherein the mined one or more search queries exclude the new item.

26. The system of claim 24, wherein the correlation value for the each of the one or more items is further based upon a frequency with which terms of the each of the one or more items co-occur with terms of the new item.

27. The system of claim 24, wherein the items of the searchable knowledge base are search tips.

28. The system of claim 24, wherein the curator removes duplicate items or expired items from the at least one of the one or more items.

* * * * *